(12) United States Patent
Moshe et al.

(10) Patent No.: US 6,714,538 B1
(45) Date of Patent: Mar. 30, 2004

(54) TELEPHONY SWITCHING APPARATUS

(75) Inventors: Joseph Moshe, Herzliya (IL); Amos Barash, Tel Aviv (IL); Avi Silbiger, Mevasseret Zion (IL); Reuven Jordan, Ramat Hasharon (IL)

(73) Assignee: ECI Telecom Ltd., Petach Tikva (IL)

( * ) Notice: Subject to any disclaimer, the term of this patent is extended or adjusted under 35 U.S.C. 154(b) by 696 days.

(21) Appl. No.: 09/620,189

(22) Filed: Jul. 20, 2000

(30) Foreign Application Priority Data

Jul. 21, 1999 (IL) .............................................. 131015

(51) Int. Cl.$^7$ .............................................. H04L 12/50
(52) U.S. Cl. ........................................ 370/369; 370/537
(58) Field of Search ................................. 370/369–386, 370/532–8; 710/30–1; 379/350–1

(56) References Cited

U.S. PATENT DOCUMENTS

| | | | | |
|---|---|---|---|---|
| 4,509,167 A | * | 4/1985 | Bantel et al. ................ | 370/261 |
| 5,193,087 A | | 3/1993 | Lichtash et al. ............ | 370/58.2 |
| 6,101,198 A | * | 8/2000 | Koenig et al. .............. | 370/535 |
| 6,333,940 B1 | * | 12/2001 | Baydar et al. .............. | 370/506 |

OTHER PUBLICATIONS

Keiser et al., Digital Telephony and Network Integration second edition, Chapman & Hall, 1995, PP:379–388.*
Model PM 4344 and PM 6344 Deframer Catalogue, PMC–Sierra, Inc., Burnaby B.C., Canada, Oct. 1998.

* cited by examiner

Primary Examiner—David Vincent
(74) Attorney, Agent, or Firm—Browdy and Neimark

(57) ABSTRACT

This invention discloses an apparatus including an input, a series of shift registers and an output, the input arranged to receive a plurality of serial data streams, each of the data streams containing groups of data, and to take simultaneously data bits from at least some of the plurality of serial data streams and to place the data bits into the series of shift registers, such that the data bits of a given bit position in the data groups of the some of the plurality of serial data streams are placeable together in one of the shift registers, and successive bits of a part of one of the data groups are placed in a given data position across the shift registers, and the output being arranged to read out, in parallel, data of a given data position across the series of shift registers, simultaneously. A method of converting a plurality of serial data streams each carrying data groups into parts of the data groups arranged in parallel is also disclosed.

17 Claims, 3 Drawing Sheets

TELEPHONY SWITCHING APPARATUS

FIELD OF THE INVENTION

The present invention relates to telephony switching apparatus and more particularly but not exclusively to apparatus for use with a cross-connect or like device for use in telephone switching.

BACKGROUND OF THE INVENTION

In a telephone network, individual telephone calls are digitized to form low level DS-0 channels which are then time domain multiplexed for transmission over digital lines. Different standards of multiplexing exist, with a North American standard containing 24 channels in its first order multiplexing signal, which is referred to as a DS-1 signal. In other parts of the world, most notably Europe, the CCITT standard is used in which the first order multiplex is called a CEPTI signal. The CEPTI signal contains between 30 and 32 DS-0 channels. At various points along the trunk there are what are known as 1/0 cross-connects which are provided in order to allow for rerouting of some of the DS-0 channels from one multiplex stream to another multiplex stream, for which access is required to the individual DS-0 channels.

In practice, the cross-connect is expected to handle large numbers of data streams in real time, and thus it often converts the serial data to an 8-bit or larger wide parallel stream for its own internal handling. In order to accomplish this with large numbers of input streams, very large numbers of serial to parallel shift registers are placed at the input and an equally large number of parallel to serial shift registers are placed at the output. For example, in order to handle 32 DS-1 data streams, each stream would require two shift registers that could be accessed in turn, giving a total of 64 shift registers. The large number of shift registers is expensive and may require use of more than one integrated circuit device. The need to use more than one integrated circuit is particularly disadvantageous.

SUMMARY OF THE INVENTION

According to a first aspect of the present invention there is provided apparatus comprising an input, a series of shift registers and an output, the input arranged to receive a plurality of serial data streams, each of the data streams containing groups of data, and to take simultaneously data bits from at least some of the plurality of data streams and to place the data bits into the series of shift registers, such that the data bits of a given bit position in the data groups of the some of the multiple data streams are placed together in one of the shift registers, and successive bits of a part of one of the data groups appear in a given data position across the shift registers, and the output being arranged to read out, in parallel, data of a given data position across the series of shift registers, simultaneously.

Preferably, the serial data streams are bundles of DS-1 signals and the data groups are DS-0 channels. In an embodiment there is further provided a demultiplexer for taking data bits simultaneously from at least some of the plurality of data streams and placing the data bits into the series of shift registers.

In one embodiment, a data buffer is placed at the input side of the series of shift registers. Preferably, the shift registers are set to operate at a first multiple greater than one of the speed at which the data groups are respectively able to provide the part of data at the input such that data of each channel can be removed from the bundle and reconstructed into the part of data in the shift registers and wherein the number of shift registers is less than the number of channels. Preferably this multiple is two. In an embodiment, the number of parallel streams is at least four.

In a particularly preferred embodiment, a number of shift registers in the series of shift registers is at most 16.

Preferably the apparatus is used to provide ports of a switching matrix. The port thus serves both as an input and an output port. There is provided a plurality of additional ports at other parts of the switching matrix, and the ports are connected via the switching matrix which is operable to switch individual words to any one of the ports according to an address. Preferably the port is also operable in reverse to bundle the parts of the data into data groups to form an output data stream.

According to a second aspect of the present invention there is provided a method of converting a plurality of serial data streams each carrying data groups into parts of the data groups arranged in parallel, the method comprising: receiving a plurality of serial data streams, each of the data streams containing groups of data, taking data bits simultaneously from at least some of the plurality of data streams, placing the data bits into a series of registers, such that the data bits of a given bit position in the data groups of the some of the multiple data streams are placed together in one of the registers, and successive bits of a part of one of the data groups appear in a given data position across the shift registers, and reading out, in parallel, data of a given data position across the series of shift registers, simultaneously.

Preferably, the data streams are bundles of DS-1 channels, the data groups are DS-0 channels, and each part of a data group is part of a DS-0 channel. The part of the data group referred to above is preferably a data word.

In a preferred embodiment the number of data streams is four and data may be input from the data streams at four times the rate of each stream.

The number of shift registers is preferably at most 16 if the number of DS-0 data channels is 64.

BRIEF DESCRIPTION OF THE DRAWINGS

For a better understanding of the invention and to show how the same may be carried into effect, reference will now be made, purely by way of example, to the accompanying drawings in which.

DESCRIPTION OF THE PREFERRED EMBODIMENTS

Figure 1:
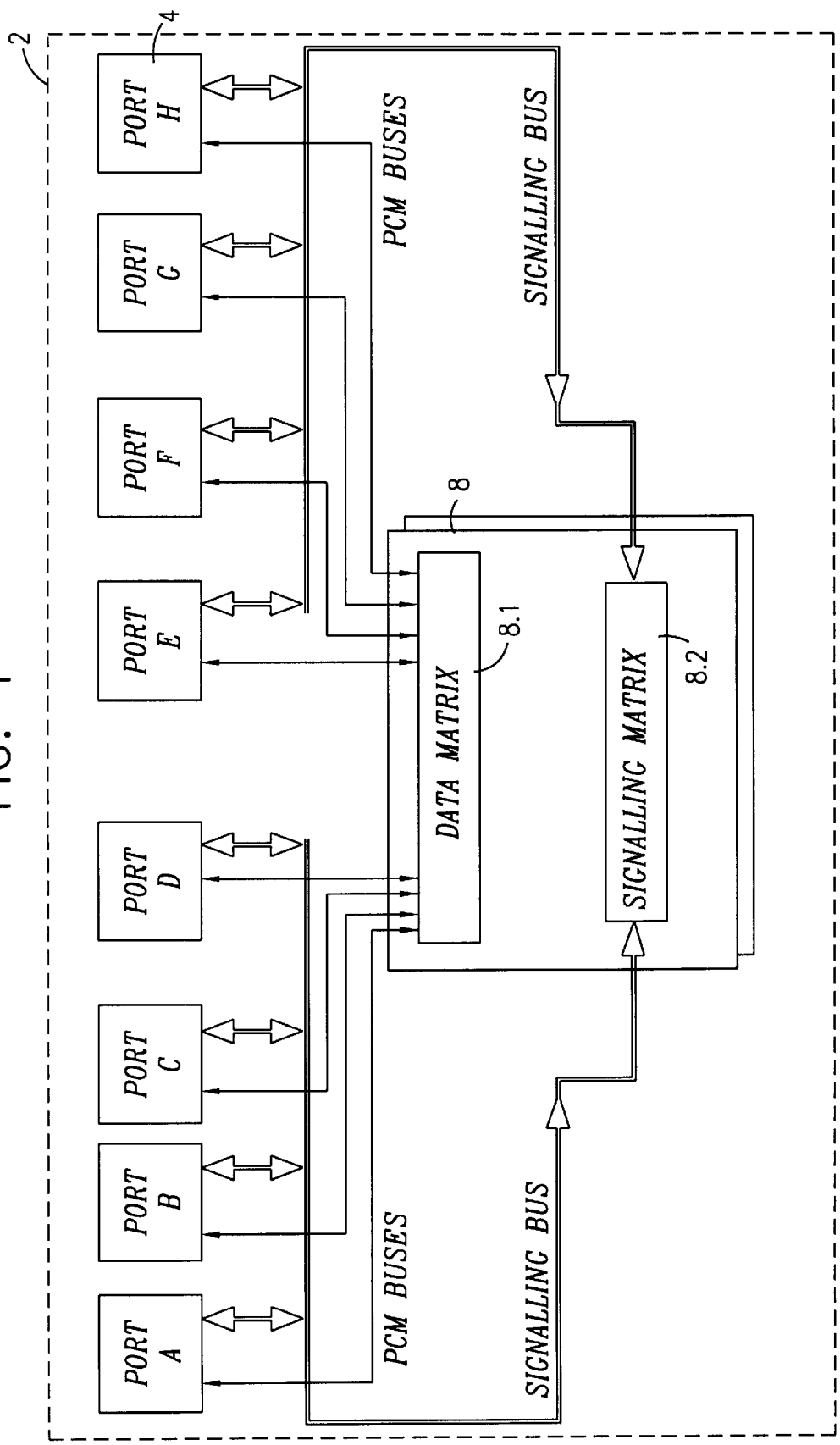
FIG. 1 is a simplified diagram of a 1/0 cross-connect according to one embodiment of the invention.

Reference is now made to FIG. 1 which is a simplified block diagram of a 1/0 cross-connect. In FIG. 1 a 1/0 cross-connect 2 comprises a series of ports 4 for receiving data in the form of DS-1 signals and sending data out thereto. A 1/0 cross-connect has the ability to interchange the DS-0 channels between the DS-1 signals and operation thereof is well known to the skilled person. A typical example is described in U.S. Pat. No. 5,193,087, the contents of which are hereby incorporated by reference. Data and signaling parts of the DS-1 signals are isolated in the ports 4 and are dealt with separately within the cross-connect. A switching matrix 8 comprises a data switching component 8.1 and a signaling switching component 8.2. The switching matrix serves to connect each port with each other port such that any particular channel can be switched as required.

The example below is described with reference to the CCITT international standard and is applicable with minor modifications that will be apparent to the skilled person to other standards such as the North American standard.

Figure 2:
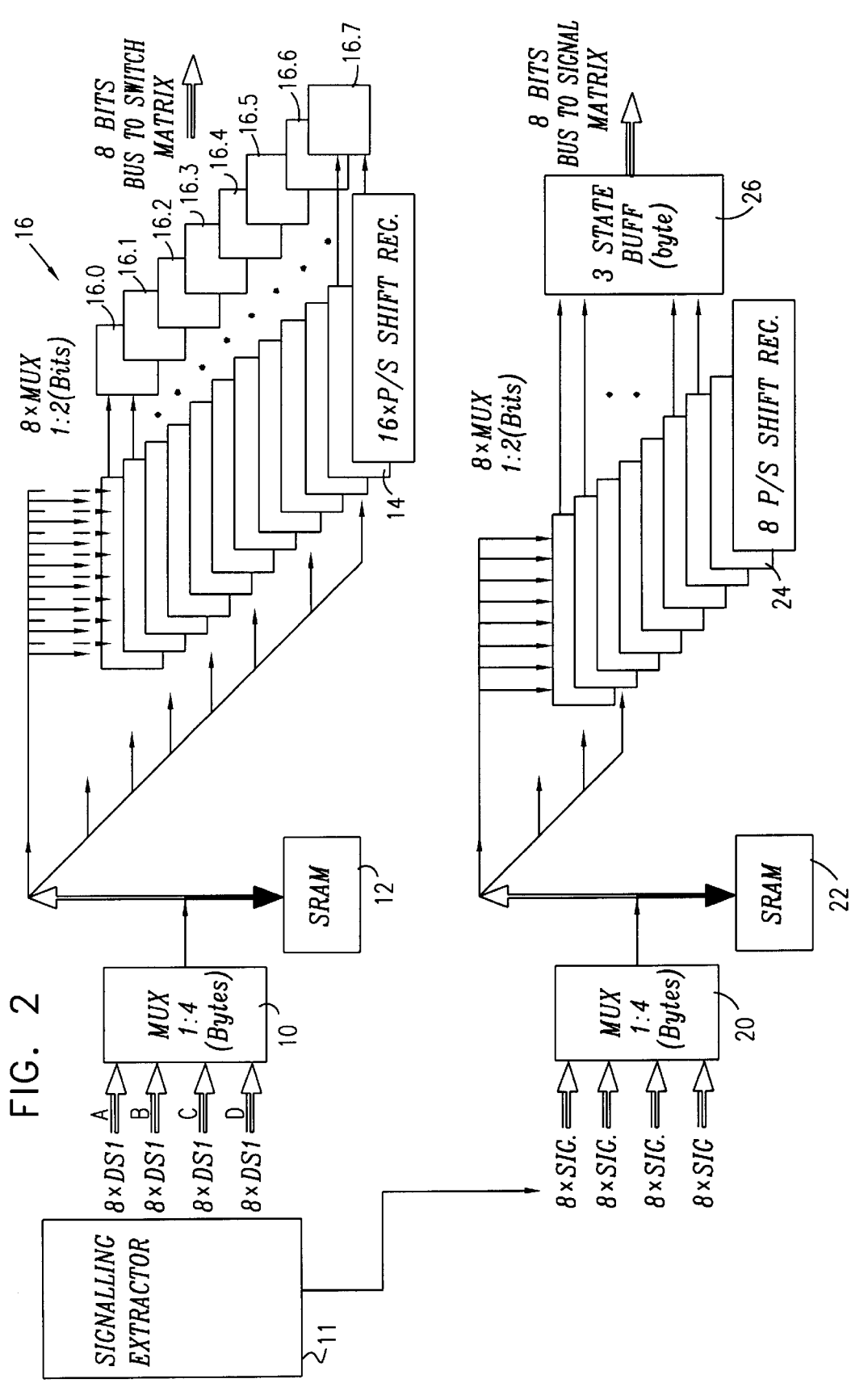
FIG. 2 is a simplified diagram showing an input port of the device of FIG. 1.

Reference is now made to FIG. 2 which shows part of the 1/0 cross-connect 2, specifically one of the ports 4. The port is connected to 28 DS-1 signals, within an architecture designed to handle 32 connections. As will be explained further below, the unused DS-1 signals are used internally by the cross-connect. The 32 DS-1 signals are first taken through a Deframer 11, such as a PM 4344 or PM 6344 made by PMC-Sierra, Inc. of Burnaby BC, Canada, in which signaling information is extracted. The signaling information is placed in a data stream of 2.048 Mbps, whose time slots parallel the slots in the data stream, and is sent separately over the signaling matrix.

In the case of T1 signals the DS-1 signals are converted to a stream at 2.048 Mbps by inserting additional blank time slots.

The 1/0 cross-connect 2 comprises a data route and a signaling route. Separate matrices are used because the signaling changes are of low frequency as compared to the data and thus can be handled in a pure time matrix, whereas the data itself is handled in a time-space-time matrix. The data route comprises a 1:4 multiplexer 10 placed at an input which is designed to take in thirty two DS-1 signals in four data streams or groups of eight signals each. Each DS-1 signal comprises between 30 and 31 DS-0 channels and switching is carried out on the DS-0 channels. As previously explained, only 28 DS-1 signals carry data communication channels, whilst the remaining four are used for internal purposes. However, from the perspective of the present invention, those remaining four signals are preferably treated in the same way as the initial 28.

The multiplexer 10 is connected to a static RAM module 12 and to a bank of shift registers 14, and the shift registers in turn are connected to a bank of eight 1:2 multiplexers 16.0–16.7. The static RAM module 12 is used for buffering the output of the multiplexer 10 for sending to the shift register bank 14.

The signaling route comprises a 1:4 multiplexer 20 which has four inputs, each taking in eight E1 signaling channels. In practice only 28 signaling channels are actually used, with the other four channels being used for internal purposes, as was mentioned above and which will be discussed more fully below. The multiplexer 20 is in turn connected to a static ram module 22 and to a bank of shift registers 24, and the bank of shift registers 24 is connected to a 3 state buffer 26. Both the data route and the signaling route lead to an 8-bit bus which in turn leads to the switching matrix 8.

The procedure for reading in data from the incoming data streams begins when the first group of DS-1 channels, denoted as group A, arrives at the multiplexer 10. The least significant bits of each of the eight DS-1 signals are read into a word into the static RAM module 12. The multiplexer 10 is operated at least four times as fast as the rate at which the DS-1 data streams appear and therefore the multiplexer is able to repeat the process for groups B, C, and D whilst the least significant bits remain at the inputs. Thus, in this time period, four data words are placed in the SRAM 12, containing the least significant bits of the thirty-two DS-1 signals.

In the next time period the multiplexer cycles once again through the four inputs and obtains data words comprising the next most significant bit from each of the four channels and the process is repeated eight times in all since the DS-1 data streams comprise 8 bit words arranged serially.

The word comprising the least significant bits of group A is now placed in the first bank of shift register 14 (bank 0) in shift register 14.0. The word consisting of the next most significant bits is placed in the next register 14.1 and so on such that the word consisting of the most significant bits is placed in the eighth register 14.7. These shift registers 14.0–14.7 are shifted out serially via the 1:2 multiplexer 16 such that the first byte read out from the shift registers 14.0–14.7 is the first byte of the first DS-0 of the first of the eight DS-1's of group A. The second byte read out is the first byte of the first DS-0 of the second DS-1 from group A and so on until the eighth byte is read out which is the first byte of the first DS-0 of the eighth DS-1 of group 1.

Whilst this is going on, the data read out from group B is read in, in an identical manner, to the second bank of shift registers (bank 1) which consists of registers 14.8–14.15. The data is read out via the second multiplexer 16 whilst data from group C is placed into bank 0 to replace the data from group A. The group C data is read out via multiplexer 16 as described above and the data from group D is placed in bank 1 and read out. The data that is read out is placed on an 8 bit bus and sent towards the switching matrix to be switched per DS-0 channel.

The entire procedure is repeated with the next DS-0 byte and the result is that all of the DS-0 channels of the 32 DS-1 signals are made separately available with the bits of each word appearing in parallel for the switching matrix. This is achieved using just 16 shift registers in place of the prior art, which uses 64.

As explained above, in a preferred embodiment only 28 of the 32 DS-1 signals are used to convey data. The remainder are utilized by the cross-connect software to allow for a safe time to reconfigure the system. These streams are filled with zeroes so as to enable reconfiguration of the matrix during the time when no active data is being transferred. Thus during the time that the matrix is transferring the unused signals, it may be reconfigured without fear of losing data.

The embodiment shown in FIG. 2 may be used for either North American or European standards. The major difference between the two is that in the European standard a channel of the DS-1 signal is utilized for signaling, whilst in the North American system the signaling may be accomplished using a single bit taken from each channel once every 6 frames. Operation of the signaling path is preferably the same as operation of the data path and thus will not be described again, except to say that since the signaling is at a much lower rate there is no need for a second set of shift registers for buffering.

Figure 3:
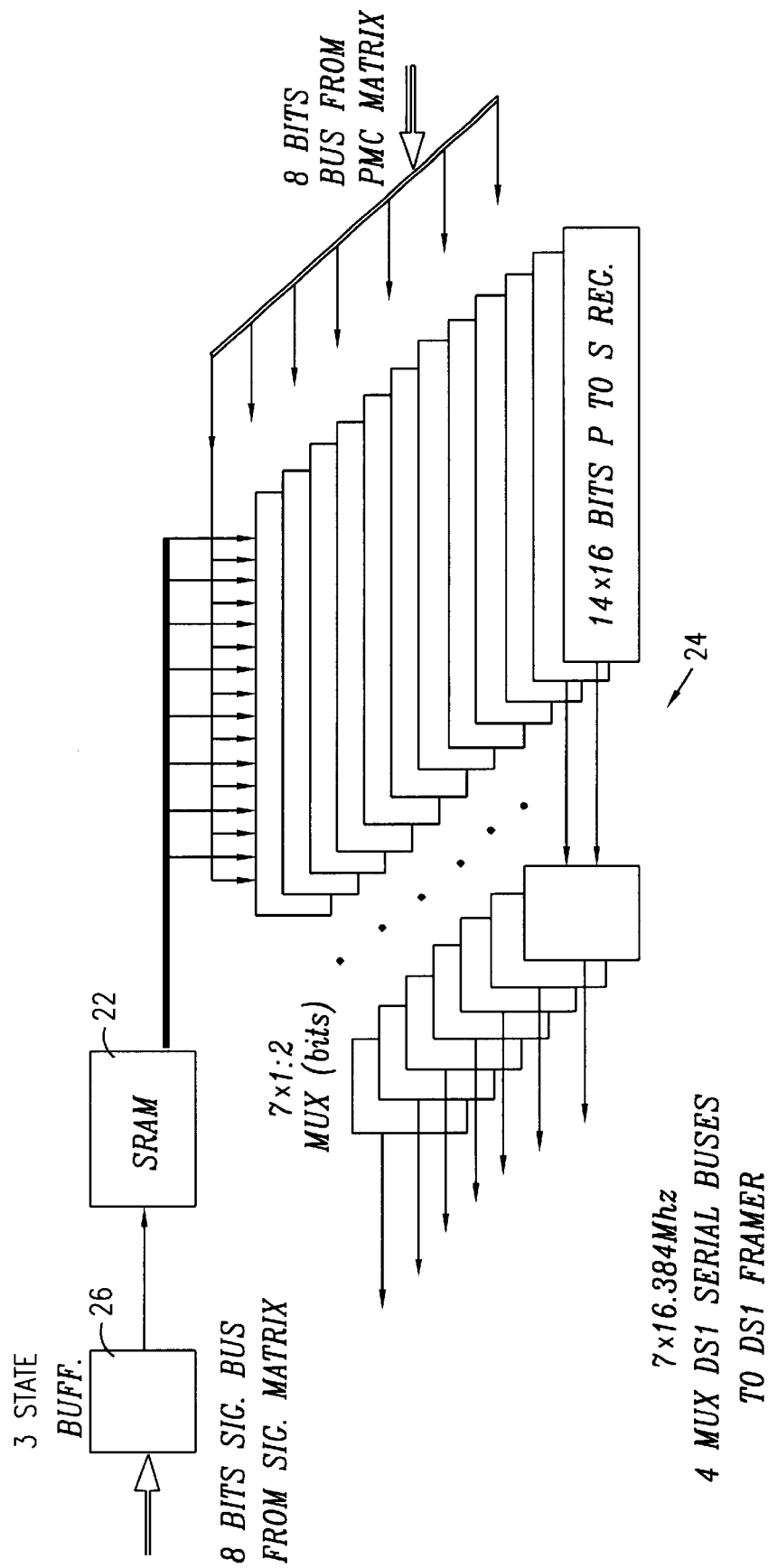
FIG. 3 is a simplified diagram showing an output port of the device of FIG. 1.

At the destination end of the cross-connect the procedure for both the signaling and data paths are reversed, and reference is now made to FIG. 3, which shows the data path at the output end of the 1/0 cross-connect. As can be seen, the output end is a mirror image of FIG. 2 and follows precisely the same procedure. It will thus not be explained again.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination. For example the static RAM and the shift registers may be combined for convenience. Also, whilst the invention has been described with relation to a cross-connect, it may be more generally applicable to any situation in which a large number of data streams need to be converted between series and parallel formats.

It will be appreciated by persons skilled in the art that the present invention is not limited to what has been particularly shown and described hereinabove. Rather, the scope of the present invention is defined only by the claims that follow.

What is claimed is:

1. Apparatus comprising an input, a series of shift registers and an output, said input arranged to receive a plurality of serial data streams, each of said data streams containing groups of data, and to take simultaneously data bits from at least some of said plurality of serial data streams and to place said data bits into said series of shift registers, such that the data bits of a given bit position in the data groups of said some of said plurality of serial data streams are placeable together in one of the shift registers, and successive bits of a part of one of the data groups are placed in a given data position across the shift registers, and said output being arranged to read out, in parallel, data of a given data position across said series of shift registers, simultaneously.

2. Apparatus according to claim 1, wherein the serial data streams are bundles of DS-1 signals and the data groups are DS-0 channels.

3. Apparatus according to claim 1, wherein there is further provided a demultiplexer for taking data bits simultaneously from at least some of said plurality of data streams and placing said data bits into said series of shift registers.

4. Apparatus according to claim 2, wherein there is further provided a demultiplexer for taking data bits simultaneously from at least some of said plurality of data streams and placing said data bits into said series of shift registers.

5. Apparatus according to claim 1, further comprising a data buffer placed at the input side of said series of shift registers.

6. Apparatus according to claim 1, wherein the shift registers are set to operate at a first multiple greater than one of the speed at which said data groups are respectively able to provide said part of one of said data groups at the input such that data of each channel can be removed from the bundle and reconstructed into said part of one of said data groups in the shift registers and wherein the number of shift registers is less than the number of channels.

7. Apparatus according to claim 3, wherein said first multiple is at least two.

8. Apparatus according to claim 7, wherein the number of parallel streams is at least four.

9. Apparatus according to claim 1, wherein a number of shift registers in said series of shift registers is at most 16.

10. Apparatus according to claim 1 wherein said input is comprised of a port which serves both as an input and an output, wherein there is provided a plurality of additional ports, wherein said ports are connected via a switching matrix operable to switch individual parts of said data groups to any one of said ports according to an address, and wherein said port is operable in reverse to bundle said parts of said data into data groups to form an output data stream.

11. A method of converting a plurality of serial data streams each carrying data groups into parts of said data groups arranged in parallel, the method comprising:

receiving a plurality of serial data streams, each of said data streams containing groups of data, taking data bits simultaneously from at least some of said plurality of data streams, placing said data bits into a series of registers, such that the data bits of a given bit position in the data groups of said some of said multiple data streams are placed together in one of the registers, and successive bits of a part of one of the data groups appear in a given data position across the shift registers, and reading out, in parallel, data of a given data position across said series of shift registers, simultaneously.

12. A method according to claim 11, wherein said data streams are bundles of DS-1 channels and said data groups are DS-0 channels, and wherein each part of a data group is part of a DS-0 channel.

13. A method according to claim 11, wherein said part of said data group is a data word.

14. A method according to claim 12, wherein said part of said data group is a data word.

15. A method according to claim 11, and wherein the number of data streams is four and wherein data is input from said data streams at four times the rate of each stream.

16. A method according to claim 12, and wherein the number of data streams is four and wherein data is input from said data streams at four times the rate of each stream.

17. A method according to claim 10, wherein the number of shift registers is at most 16.

* * * * *